United States Patent [19]
Sadler et al.

[11] Patent Number: 5,801,963
[45] Date of Patent: Sep. 1, 1998

[54] METHOD OF PREDICTING OPTIMUM MACHINING CONDITIONS

[75] Inventors: John P. Sadler; Ibrahim S. Jawahir; Zhongjie Da; Seog S. Lee, all of Lexington, Ky.

[73] Assignee: The University of Kentucky Research Foundation, Lexington, Ky.

[21] Appl. No.: 744,907

[22] Filed: Nov. 8, 1996

Related U.S. Application Data

[60] Provisional application No. 60/006,545 Nov. 13, 1995.

[51] Int. Cl.$^6$ .............................. G06F 19/00; G06G 7/66
[52] U.S. Cl. .................. 364/551.02; 364/148; 364/149; 364/474.01; 364/474.15
[58] Field of Search ........................ 364/551.02, 551.01, 364/148, 149, 150, 151, 152, 153, 474.01, 474.02, 474.15, 474.16, 474.17, 578; 318/561, 569, 570, 571; 73/104, 105

[56] References Cited

U.S. PATENT DOCUMENTS

| | | | |
|---|---|---|---|
| 3,671,727 | 6/1972 | Rhodes . | |
| 3,671,839 | 6/1972 | Meyer et al. . | |
| 3,873,816 | 3/1975 | Takeyama et al. . | |
| 4,594,270 | 6/1986 | Brooks . | |
| 4,833,617 | 5/1989 | Wang . | |
| 4,926,309 | 5/1990 | Wu et al. . | |
| 5,159,562 | 10/1992 | Putman et al. | 364/494 |
| 5,166,873 | 11/1992 | Takatsu et al. | 364/151 |
| 5,191,521 | 3/1993 | Brosilow | 364/160 |
| 5,255,201 | 10/1993 | Maeda . | |
| 5,285,378 | 2/1994 | Matsumoto . | |
| 5,303,385 | 4/1994 | Hattori et al. | 395/22 |
| 5,305,230 | 4/1994 | Matsumoto et al. | 364/495 |
| 5,315,521 | 5/1994 | Hanson et al. | 364/468 |
| 5,331,565 | 7/1994 | Hattori et al. | 364/472 |
| 5,347,446 | 9/1994 | Iino et al. | 364/149 |
| 5,377,116 | 12/1994 | Wayne et al. | 364/474.17 |
| 5,457,625 | 10/1995 | Lim et al. | 364/149 |
| 5,486,995 | 1/1996 | Krist et al. | 364/149 |
| 5,587,897 | 12/1996 | Iida | 364/148 |
| 5,659,493 | 8/1997 | Kiridena et al. | 364/578 |
| 5,689,062 | 11/1997 | Jawahir et al. | 73/104 |
| 5,691,909 | 11/1997 | Frey et al. | 364/474.01 |

OTHER PUBLICATIONS

Arakawa et al., "A Simultaneous Optimization Algorithm for Determining Both Mechanical System and Controller Parameters for Positioning Control Mechanisms", IEEE, Sep. 1996.

DA, Z.J.; Multiple Criteria Optimization of Finish Turning Operations Based on a Hybrid Model; Proceedings of the 1996 ASME Deisgn Engineering; Aug. 18–22, 1996; 1–10.

DA, Z.J.; Optimum Machining Performance in Finish Turning with Complex Grooved Tools; ASME 1995 International Mechanical Engineering; Nov. 12–17, 1995.

*Primary Examiner*—James P. Trammell
*Assistant Examiner*—Patrick Assovad
*Attorney, Agent, or Firm*—King and Schickli

[57] ABSTRACT

A computer implemented method for achieving optimum selection of machining parameters and tool inserts for finish turning operations is provided. The computer implemented method allows for the simultaneous consideration of the various machining performance criteria which are highly interactive and need to be taken into consideration when defining optimum cutting conditions or selecting optimum tool inserts for particular cutting conditions. The computer implemented method broadly includes the steps of (1) developing a process model for interrelating performance variables and process parameters for finish turning operations; (2) selecting one of the performance variables for optimization while maintaining the remaining performance variables and process parameters as constraints on the optimization process; and (3) applying non-linear programming techniques to the process model in order that optimum cutting conditions may be determined for a given tool insert or an optimum tool insert may be selected for given machining performance requirements.

7 Claims, 2 Drawing Sheets

METHOD OF PREDICTING OPTIMUM MACHINING CONDITIONS

Benefit of priority is hereby claimed on U.S provisional application Ser. No. 60/006,545, filed Nov. 13, 1995, entitled "Method of Predicting Optimum Machining Conditions".

TECHNICAL FIELD

The present invention relates generally to the field of machining performance and finish turning operations and, more particularly, to a method for selecting optimum cutting conditions and/or tool inserts for specified machining performance requirements.

BACKGROUND OF THE INVENTION

The demands of modern manufacturing technology require that machining operations be performed in a manner so as to efficiently enhance economic, time and equipment aspects of the manufacturing process. As an example, recent trends toward "near net shape" manufacturing have significantly reduced the need for multipass rough machining operations while placing more of an emphasis on single pass finish machining. However, it is still important when designing such manufacturing techniques for finish turning operations that overall machining performance be of the highest quality.

Generally, the overall machining performance can be quantitatively described by the surface roughness, machining accuracy, cutting force/power, tool wear/tool life and chip breakability. Key factors which are known to effect machining performance include the machine tool, cutting tool, cutting parameters, work material, and cutting fluid. These various performance criteria are highly interactive and the relationships describing the interaction are very complex. Therefore, due to these complexities, many of these highly desirable features are very difficult to achieve in combinations as the trade off in achieving one normally results in significant loss in others. For example, in finish turning operations, increasing productivity through higher material removal rates requires that cutting tools be provided which are capable of longer tool life while still being capable of maintaining the required surface finish level and acceptable chip-forms/shapes or chip breakability. In addition, increased cutting speeds impose a power constraint.

U.S. Pat. No. 4,833,617 to Wang discloses a method for modeling an adaptive feed rate control for numerically controlled machining. This method takes into consideration such operating parameters as material removal rate, cutting force and tool deflection. However, there are numerous other operating parameters, as described above, which if taken into consideration would increase the accuracy of the modeling method.

Similarly, U.S. Pat. No. 4,926,309 to Wu et al. discloses a method that utilizes artificial intelligence for adaptive machining control of surface finish in a machining operation. The Wu et al. method takes into consideration a variety of operating parameters, such as, tool wear, depth of cut, work piece hardness and material removal rate. Again, however, only a limited number of operating parameters and machining performance criteria are taken into consideration, thus significantly limiting the reliability and overall accuracy provided by this method.

The Wang and Wu et al. patents are representative of the prior art which typically rely upon a limited number of operating parameters and consider limited number of machining performance criteria. In other words, the prior art has essentially ignored important machinability criteria and key factors which machining performance. This may be attributed to the limited availability of quantitatively reliable machining performance models relating the surface finish, dimensional accuracy, chip breakability, and other machining performance variables to the cutting or process parameters. More specifically, currently available metal cutting theories are unable to explicitly present all relationships between input variables and machining behavior, especially for complex grooved tools which are primarily used in finish turning operations today. While there have been many attempts to build phenomenological models of metal cutting processes, these theories are not yet able to solve all the problems which currently exist during the machining operation. Moreover, the large number of variables involved results in an almost infinite number of machining combinations.

Accordingly, while much is known and much work has been done towards improving the machining process and its efficiency for finish turning operations, a need is identified for further improving the machining process through the selection of the most suitable cutting conditions and/or tool insert types for given quality requirements. Such an optimization method would be able to take all machinability parameters simultaneously into consideration.

SUMMARY OF THE INVENTION

Accordingly, it is a primary object of the present invention to provide a new and improved method for selecting optimum machining parameters and tool inserts in finish turning operations overcoming the above described limitations and shortcomings of the prior art. More specifically, the method allows for selecting optimum cutting conditions and/or tool inserts based upon a particular set of conditions existing during a finish turning operation requiring the use of complex grooved tool inserts.

Another object of the present invention is to provide a method for selecting optimum machining performance criteria in finish turning operations which is able to take all major machinability parameters simultaneously into consideration.

Yet another object of the present invention is to provide a method for selecting optimum machining conditions in finish turning operations by developing a process model which takes into consideration a combination of analytical results and experimental data to determine new relationships between machinability parameters and machining conditions. Nonlinear programming techniques may then be applied, in conjunction with the process model for achieving an optimum selection of cutting conditions and/or cutting tool inserts.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, an improved method is provided for achieving optimum machining performance criteria in finish turning operations. Generally, the method includes the first step of developing a process model. The process model defines the relationship between the machining performance criteria and machining conditions and more particularly describes the relationship between a group of selected performance variables and a group of selected process parameters for a selected finish turning operation. More specifically, the performance variables may be selected from the group consisting of cutting force, tool life, material removal rate, surface roughness and chip breakability. In addition, the process parameters may be selected from a group consisting of cutting speed, feed, and depth of cut. Advantageously, the process model attempts to interrelate a large number of machining performance criteria so as to improve the overall accuracy and efficiency of the optimization method.

The method may also be broadly described as including the step of selecting one of the performance variables as the optimization objective. The remaining performance variables, as well as the process parameters which are not optimized, will then be used as constraints to define acceptable limits on those particular criteria. Thus, all of the performance variables and process parameters are utilized during the selection of optimum machining performance conditions even though only one particular performance variable is being optimized.

The method further includes the step of applying non-linear programming techniques to the process model in order to identify optimum machining performance and machining parameters. More specifically, the non-linear programming techniques allow for the determination of optimum cutting conditions for a given tool insert and/or an optimum tool insert may be selected for given performance requirements.

More specifically describing the method, the development of the process model includes defining the relationships between the performance variables and the process parameters based upon either classic theories of metal cutting or a database of experimental results. Specifically, the database of experimental results will be used to determine empirical constants and, coupled with numerical methods for data interpolation, to describe relationships that cannot be analytically determined by theory.

The process model includes modeling the performance variable cutting force based upon cutting force values expressed in the form:

$$F_z = C_z f^{\alpha_z} d^{\beta_z} + E_z d^{\gamma_z}$$ Equation 1

Where:

$F_z$ = component of cutting force in the cutting direction
f = feed
d = depth of cut
$C_z$ and $E_z$ = force constants
$\alpha_z$ = feed exponent
$\beta_z$ and $\gamma_z$ = depth of cut exponents The process model includes modeling the performance variable tool life in the form:

$$T = \frac{C}{V^{\frac{1}{n}} f^{\frac{1}{m}} d^{\frac{1}{l}}}$$ Equation 2

Where:

T = tool-life
V = cutting speed
f = feed
d = depth of cut
C, n, m, and l = constants for given work and tool material The process model includes modeling the performance variable material removal rate in the form:

$$MRR = 1000 V f d$$ Equation 3

Where:

V = cutting speed m/min
f = feed mm/rev
d = depth of cut mm

The step of developing the process model further includes modeling the remaining performance variables, surface roughness and chip breakability, based upon a database of experimental results for actual surface roughness and chip breakability values. The experimental test data coupled with numerical methods for data interpretation allow for the inclusion of these particular performance variables which otherwise cannot be analytically determined. More specifically, bi-cubic spline interpolation of surface roughness test data is used to obtain the surface roughness in terms of feed and depth of cut. Similarly, a bi-cubic spline interpolation of chip breakability test data is used to determine the chip breakability in terms of feed and depth of cut.

It should be appreciated that the preferred embodiment of the present method for selecting optimum machining performance criteria is presented in terms of a computer implemented method, i.e. a software package has been developed to facilitate the application of the methodology described above. Advantageously, the computer implemented method allows for the establishment of the relationship between the performance variables and the process parameters through the creation of the process model. The user of the computer implemented method is allowed to interface with the software so as to choose different machining performance criteria, more specifically different performance variables, as optimization objectives and to further define the desired constraints in qualitative terms. Further, the computer implemented method provides for the completion of the nonlinear programming techniques to the optimization objectives so as to select optimum cutting conditions and/or optimum tool inserts.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrates several aspects of the present invention and together with the description serves to explain the principles of the invention. In the drawing.

Reference will now be made in detail to the present preferred embodiment of the invention, an example of which is illustrated in the accompanying drawing.

DETAILED DESCRIPTION OF THE INVENTION

It is well known that when designing for finish turning operations, it is extremely important that all the basic machinability factors be achievable. The various performance criteria present in a finish turning operation are highly interactive and the relationships defining the performance criteria are very complex. This makes the selection of optimum machining performance criteria very difficult to achieve. Accordingly, the present method provides for taking all machinability parameters simultaneously into consideration allowing for the optimization of a machining process for optimum performance parameters and selection of the most suitable cutting conditions and/or tool insert types for specified requirements.

Figure 1:
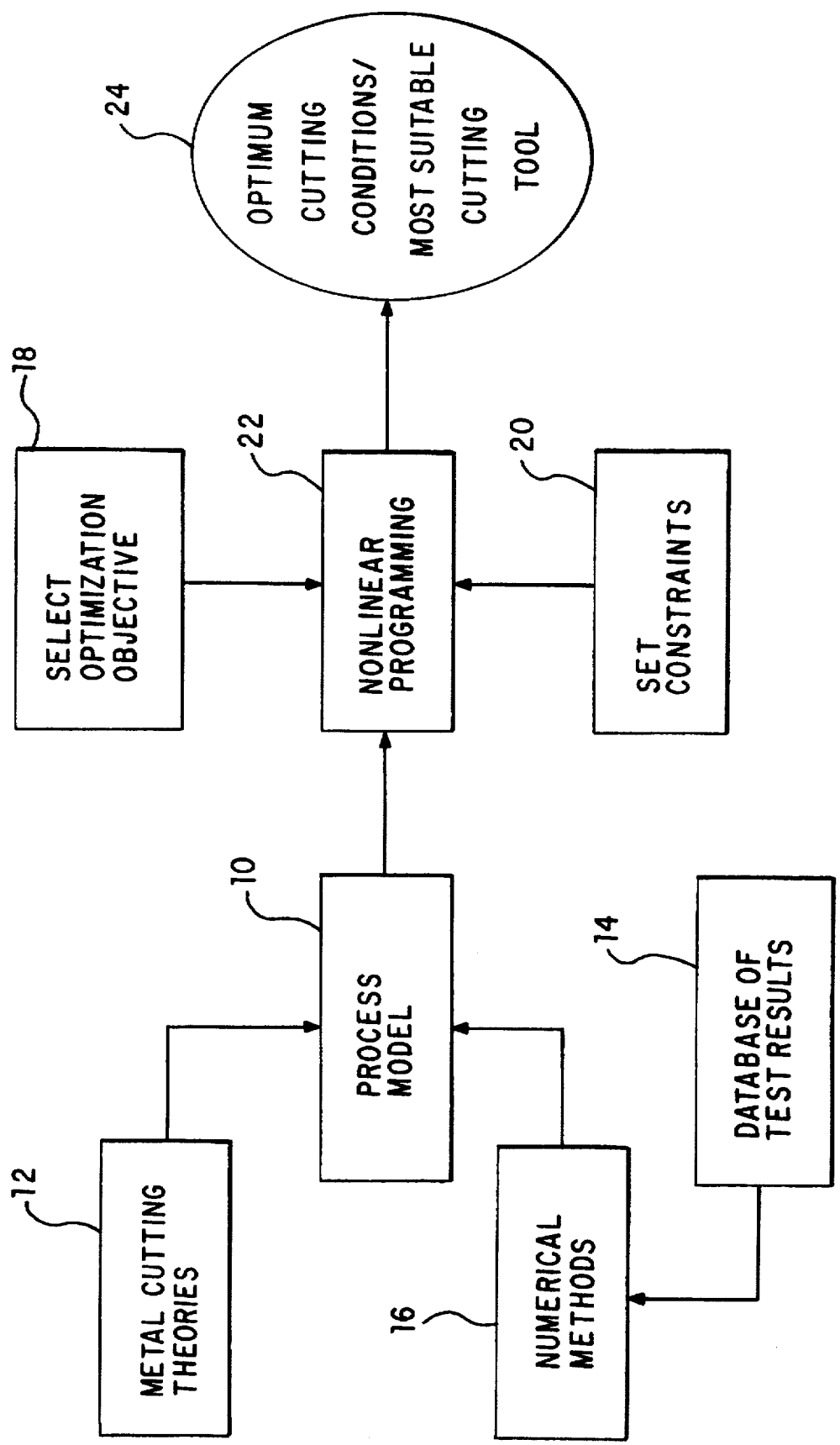
FIG. 1 is a flow chart illustrating the methodology of the present method for achieving optimum machining performance criteria in finished turning operations.

With reference to FIG. 1, there is shown the methodology of the present invention for selecting optimum machining conditions in finish turning operations. More specifically, the method includes the step of first developing a process model 10 for defining the relationships between a group of dependent performance variables and a group of independent process parameters. The development of the process model 10 includes applying classic metal cutting theories 12 to the performance variables which may be determined analytically. In addition, development of the process model 10 includes providing a database of experimental test results 14 to which numerical methods 16 are applied for describing the relationships between the remaining performance variables which cannot be analytically determined. This results in the development of the process model 10 which simultaneously takes into consideration the performance variables and the process parameters, thus defining the relationships therebetween.

The performance variables which are defined within process model 10 may be selected from a group of variables consisting of cutting force, tool life, material removal rate, surface roughness and chip breakability. Furthermore, the process parameters may be selected from a group consisting of cutting speed, feed and depth of cut. Thus, it should be appreciated that the various performance criteria which go into the development of the process model 10 takes into consideration the maximum amount of performance criteria. This insures the accuracy and reliability of the present method for selecting optimum machining conditions. However, it should be appreciated that additional performance variables and process parameters may be included while still maintaining the overall methodology of the present invention.

More specifically describing the development of the process model 10, the performance variables, cutting force, tool life and material removal rate are modeled based upon the analytical determination of these variables. In contrast, the process model 10 includes modeling the performance variables surface roughness and chip breakability based upon the application of numerical methods for data interpolation to a database of experimentally obtained test results for these particular variables.

Particularly, development of the process model 10 includes modeling the performance variable cutting force based upon cutting force values expressed in the form:

$$F_z = C_z f^{\alpha_z} d^{\beta_z} + E_z d^{\gamma_z}$$ Equation 1

Where:

$F_z$=component of cutting force in the cutting direction
f=feed
d=depth of cut
$C_z$ and $E_z$=force constants
$\alpha_z$=feed exponent
$\beta_z$ and $\gamma_z$=depth of cut exponents Note: All constants and exponents in Equation 1 are obtained by using the least square technique and experimental results, see Da, Z.J. et al.; "Optimum Machining Performance in Finish Turning with Complex Grooved Tools"; Manufacturing Science and Engineering, MED—Volume 2, No. 1/MH—Volume 3, No. 1, ASME; 1995; pp. 703–14.

Development of the process model 10 further includes the modeling of the performance variable tool life based upon tool life values expressed in the form of:

$$T = \frac{C}{V^{\frac{1}{n}} f^{\frac{1}{m}} d^{\frac{1}{l}}}$$ Equation 2

Where:

T=tool-life
V=cutting speed
f=feed
d=depth of cut
C, n, m, and l=constants for given work and tool material Note: All constants and exponents are used in conjunction with Equation 2 are experimentally obtained values, see Cook, N. K.; "Tool Wear and Tool Life"; ASME Journal of Engineering for Industry; 1973; Volume 93; pp. 931–8.

Further describing the method, development of the process model 10 includes modeling the performance variable material removal rate based upon material removal rate values expressed in the form of:

$$MRR = 1000 V f d$$ Equation 3

Where:

V=cutting speed /mmin
f=feed mm/rev
d=depth of cut mm

While the performance variable surface roughness may be analytically determined in an approximate manner by considering the geometry of a given cutting tool, such calculations result in inaccurate determinations of surface roughness for finish turning operations. This is a result of finish turning is operations involving a number of additional tool geometry-work material related features that are likely to influence the surface finish levels quite significantly. Therefore, the development of the process model 10 includes modeling the performance variable surface roughness based upon experimentally obtained values for combinations of different operating parameters.

More specifically describing the determination of surface roughness, the equipment used to measure the surface roughness may be, for example, a Taylor-Hopson Form Talysurf Surface Measuring System (Model S3C) complete with a Hewlett-Packard computer and a DAS unit. The undulations of a surface can be explored by its diamond stylus with a tip radius of 0.0001 inch. More particularly, as the stylus moves over the surface irregularities, the signal will be conducted into the data acquisition system. The computer processes the data, and then gives the profile of the surface and the values of surface roughness. Cubic spline interpolation of the test data is then used to obtain the surface roughness function in terms of the operation variables. The effect of cutting speed on surface roughness is considered to be invariant within the cutting speed range of finish turning, and surface roughness is thereby reduced to the function of feed and depth of cut within the range of finishing cuts. This assumption is based on the fact that the surface roughness is most sensitive to changes in feed and least sensitive to changes in cutting speed for finish turning operations. Accordingly, this allows for development of the process model 10 to simultaneously take into consideration the performance variable surface roughness along with the other performance variables and process parameters.

Similarly, the performance variable chip breakability, which needs to be considered as one of the basic requirements in automated machine systems, cannot be accurately determined analytically and, therefore, must be determined based upon experimental test results. Particularly, chip breakability is not uniquely definable due to the inherent "fuzziness" in the understanding of the "acceptability" levels of chip-forms/shapes. The present invention utilizes the definition of chip breakability as given in the article Fang, X. D. and Jawahir, I. S., "The Effects of Progressive Tool Wear and Tool Restricted Contact on Chip Breakability in Machining", Wear, Volume 160, pages 243–52 (1993).

This definition of chip breakability assumes that the size, shape and difficulty/ease of chip producibility determines the levels of chip breakability, with weighing factors of 60%, 25% and 15%, respectively. According to the definition, the values of chip breakability range between 0 and 1. The fuzzy membership values are related to the fuzzy definition of chip breakability as shown in Table 1.

TABLE 1

The Definition of Chip Breakability

| Membership Values | Fuzzy Definition of Chip Breakability | Most Likely Chip Shapes/Sizes Produced in Machining |
|---|---|---|
| 0.0–0.2 | Absolutely unbroken | Large snarled, continuous and long size with large coil |
| 0.2–0.3 | Very difficult to break | Continuous and long, snarled with medium or large size |
| 0.3–0.45 | Usually difficult to break | Long (continuous or broken), snarled often with few turns or small in size |
| 0.45–0.5 | Less likely to break | Medium size, spiral with few turns |
| 0.5–0.58 | More likely to break | Short to medium size, flat spiral with medium size conical spiral and medium in size |
| 0.58–0.7 | Usually easy to break | Short size, full turn, flat or conical spiral and short in size |
| 0.7–0.9 | Very easy to break | Side-curl arcs or up-curl arcs |
| 0.9–1.0 | Always broken | Small up-curl or connected side-curl arcs |

As with the determination of the performance variable surface roughness, in order to determine chip breakability, the effect of cutting speed on chip breakability is ignored within the cutting speed range of finish turning, and bi-cubic spline interpolation is used to determine chip breakability in terms of feed and depth of cut. Based upon this information, the modeling of the performance variable chip breakability is possible for inclusion in the process model 10.

As should be appreciated, the completion of the information relating to the performance variables and the process parameters results in the establishment of the process model 10. Specifically, the process model 10 provides a database of experimental results to be used in conjunction with the methodology of the present invention which defines the relationships between the machining performance criteria and finish turning conditions. The creation of the process model 10 allows for an optimization procedure to be performed while taking all machinability parameters simultaneously into consideration.

Once the process model 10 has been created, the present method includes selecting a performance criteria as an optimization objective, as designated by reference numeral 18 in FIG. 1. Specifically, one of the performance variables is chosen as the optimization objective. Of course, optimization includes either maximizing or minimizing the particular performance variable based upon the particular needs of a given finish turning operation.

Furthermore, the remaining performance variables, as well as the process parameters, are used as constraints for defining acceptable limits on those cutting parameters particular performance criteria. The designation of the remaining performance variables and the process parameters as constraints on the optimization procedure is generally designated as reference numeral 20 in FIG. 1.

Following selection of the optimization objective 18 and the setting of constraints 20, the method of the present invention includes applying the step of applying optimization techniques to the process model 10. More specifically, the method includes applying non-linear programming techniques 22 to the process model 10 so that optimum cutting conditions may be determined for a given tool insert and/or an optimum tool insert may be selected for given machining performance requirements.

The present method includes applying non-linear programming techniques such as provided for in Vanderplaats, G. N., "Numerical Optimization Techniques for Engineering Design with Applications", McGraw-Hill Book Company; 1984. This particular non-linear programming problem can be expressed as:

| minimize/maximize with respect to subject to | F(x) x $G_i(x) <= 0,$ $H_j(x) = 0,$ | $i = 1,2, \ldots I$ $j = 1,2, \ldots J$ Equation 4 |
|---|---|---| where:

F(x)=a scalar objective function which defines the primary optimization criterion;

Vector x=the design or process variables; and

Functions $G_i(x)$ and $H_j(x)$=sets of inequality and equality constraints, respectively, which define the feasible optimization space.

As should be appreciated, various constraint optimization algorithms can be used in conjunction with the methodology of the present invention. The preferred embodiment of the present invention utilizes the sequential quadratic programming method to perform the optimization. This particular non-linear programming method is set forth and described in detail in Press, W. H., "Numerical Recipes in Pascal", Cambridge University Press, 1989. Accordingly, by applying the non-linear programming techniques 22 to the process model 10, the present invention allows for the determination of optimum cutting conditions for a given tool insert or for the determination of an optimum tool insert for given machining performance requirements as designated by reference numeral 24.

Advantageously, the preferred embodiment of the present invention includes a computer program developed as copyrighted software and filed with parent provisional patent application Ser. No. 60/006,545 having a filing date of Nov. 13, 1995, the full disclosure of which is incorporated herein by reference. This computer program facilitates the application of the methodology described above for achieving optimum machining performance in finish turning operations. Specifically, this computer program allows the user to choose different machining performance criteria as the optimization objectives 18 and to define the desired constraints 20 in qualitative terms.

Utilizing the computer implemented method of the present invention, the primary optimization options are, for example, as follows:

(a) Optimize machining performance by minimizing surface roughness for a required chip breakability and cutting force;

(b) Optimize machining performance by minimizing cutting force for a required surface roughness and chip breakability;

(c) Optimize machining performance by maximizing chip breakability for a required cutting force and surface roughness;

(d) Optimize machining performance by maximizing tool-life for a required surface roughness, cutting force and chip breakability; and (e) Optimize machining performance by maximizing material removal rate for a required surface roughness, cutting force and chip breakability. Thus, the computer program may be used to achieve optimum process variables for a given cutting tool or to make a comparative analysis of different tool inserts leading to the recommendation of a tool to the user of the present method.

In addition, the computer program includes a table like interface, as illustrated in Table 2, which enables the user to work directly with the database of test results information as contained within process model 10. Advantageously, the user can expand the size of the database, modify the data for some inserts or build up an entirely new database for use with a particular finish turning operation. However, the unmodified database is automatically saved for backup purposes.

TABLE 2

Interface for Modifying the Database

A. Surface Roughness (μm)*

| depth (mm)/<br>feed (mm/rev) | 0.254 | 0.635 | 1.016 | 1.905 |
|---|---|---|---|---|
| 0.056 | 0.584 | 0.660 | 0.508 | 0.508 |
| 0.074 | 0.635 | 0.762 | 0.559 | 0.737 |
| 0.107 | 0.762 | 0.838 | 0.737 | 0.838 |
| 0.130 | 1.041 | 1.067 | 0.914 | 1.041 |
| 0.191 | 1.676 | 1.651 | 1.448 | 1.473 |
| 0.254 | 2.642 | 2.692 | 2.540 | 2.692 |

B. Cutting Force (N)*

| depth (mm)/<br>feed (mm/rev) | 0.254 | 0.635 | 1.016 | 1.905 |
|---|---|---|---|---|
| 0.056 | 107 | 152 | 223 | 338 |
| 0.074 | 120 | 183 | 254 | 459 |
| 0.107 | 152 | 227 | 317 | 584 |
| 0.130 | 169 | 259 | 384 | 700 |
| 0.191 | 223 | 375 | 562 | 990 |
| 0.254 | 285 | 482 | 807 | 1271 |

TABLE 2-continued

Interface for Modifying the Database

C. Chip Breakability (0–1)*

| depth (mm)/<br>feed (mm/rev) | 0.254 | 0.635 | 1.016 | 1.905 |
|---|---|---|---|---|
| 0.056 | 0.10 | 0.10 | 0.20 | 0.12 |
| 0.074 | 0.10 | 0.12 | 0.20 | 0.15 |
| 0.107 | 0.50 | 0.70 | 0.80 | 0.16 |
| 0.130 | 0.50 | 0.75 | 0.70 | 0.24 |
| 0.191 | 0.50 | 0.80 | 0.75 | 0.60 |
| 0.254 | 0.50 | 0.91 | 0.80 | 0.60 |

*Taylor Constant and Exponents
C = 214233.
n = 0.462
m = 1.815
l = 1.337

The following examples are presented to further illustrate the usefulness of the present method, and particularly the computer implementation of the present method, but the examples are to be considered as illustrative and the invention is not to be considered as limited thereto.

Example 1

As previously described, the present method allows for the determination of optimum machining conditions for a given tool insert. In this first example, tool life is chosen as the objective function to be maximized and the requirements on the remaining performance variables, cutting force, surface roughness, chip breakability and material removal rate are set as constraints of the optimization process. The following illustrates the information which is input into the computer implemented method of the present invention, as well as, the results which are given following the application of the present methodology.

INPUT:
  Tool Insert:
    1. INSERT-1 (TNMG332, CG1)
  Surface Roughness:
    4. small (Ra less than or equal to 0.8 micrometer)
  Cutting Force:
    2. low (less than or equal to 400 Newtons)
  Material Removal Rate:
    1. very low (greater than or equal to 10,000 mm**3/min
  Chip Breakability:
    3. less likely to break (CB greater than or equal to 0.45)

RESULTS:
  Cutting Speed: 230 m/min
  Feed: 0.105 mm/rev
  Depth of Cut: 0.412 mm
  Surface Roughness: 0.8 microns
  Chip Breakability: 0.571
  Cutting Force: 181 Newtons
  Material Removal Rate: 10,000 mm**3/min
  Tool life: 11.2 min As shown, the optimum performance variables and process parameters are given in the RESULTS output portion of the computer program. As can be appreciated from this particular example, all the performance requirements have been satisfied for the optimum cutting conditions. Advantageously, all the major machining performance criteria were simultaneously taken into consideration in order to obtain the displayed results.

Figure 2:
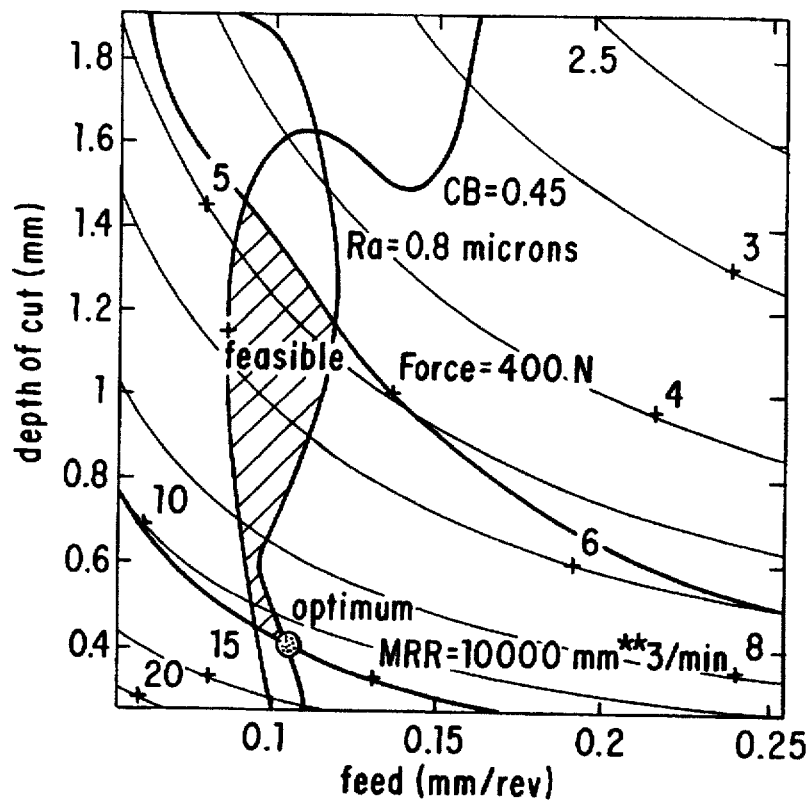
FIG. 2 is a graphical display showing the INPUT/RESULTS as set forth in Example 1.

See FIG. 2 for a graphical display of the INPUT/RESULTS for Example 1, as described herein.

Example 2

Figure 3:
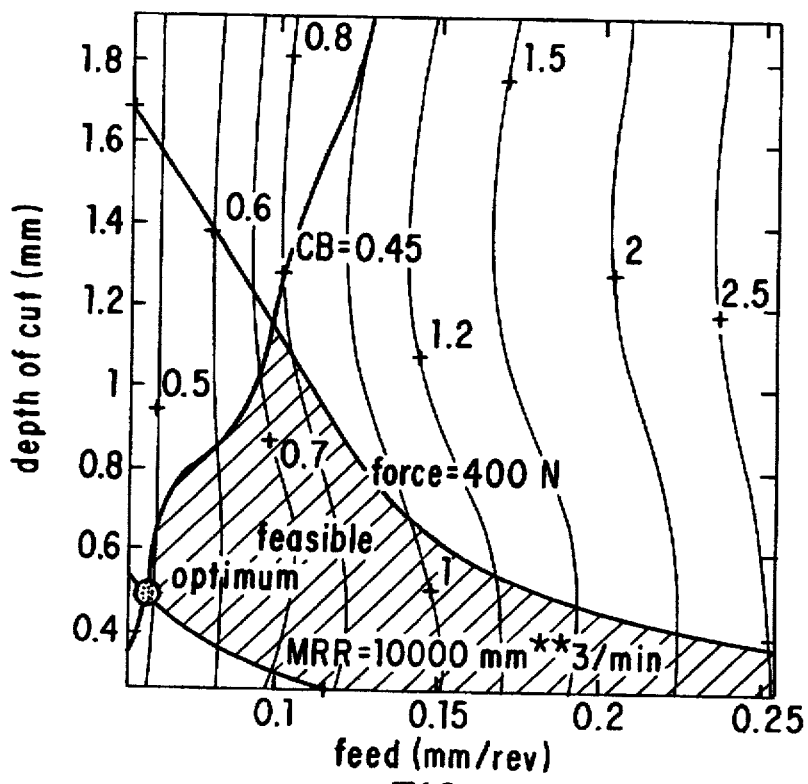
FIG. 3 is a graphical display showing the INPUT/RESULTS as set forth in Example 2.

The following example sets forth the capabilities of the present invention to make an optimum selection of a cutting tool insert for specified requirements and the determination of corresponding machining conditions. In order to select the optimum cutting tool, a sub-group of cutting tools to be selected from must be chosen. This subgroup may include, for example, the following five tool inserts:

1. INSERT-1 (TNMG332, CG1)
3. INSERT-3 (TNMG332, CG2)
8. INSERT-8 (TNMG331, CG3)
10. INSERT-10 (TNMG331, CG4)
13. INSERT-13 (TNMG332, CG5) The number before the tool name denotes the tool number in the database. Following selection of the tool insert subgroup, the method proceeds to determine the most suitable tool insert and optimum machining conditions. This particular example designates that the optimization criterion is to minimize surface roughness for given requirements of cutting force, chip breakability and material removal rate. The input and results of selection of a cutting tool insert for this example is as follows:

INPUT:
  Chip Breakability:
    3. less likely to break (CB greater than or equal to 0.45)
  Cutting Force:
    2. low (less than or equal to 400 Newtons)
  Material Removal Rate:
    3. low (greater than or equal to 10000 mm**3/min)
  Inserts to be Examined: 1, 3, 8, 10, 13
RESULTS:
  Tool Insert: 3.INSERT-3 (TNMG332, CG2)
  Cutting Speed: 331 m/min
  Feed: 0,061 mm/rev
  Depth of Cut: 0.497 mm
  Surface Roughness: 0.491 microns
  Chip Breakability: 0.450
  Cutting Force: 168 Newtons
  Material Removal Rate: 10000 mm**3/min As shown, the optimum selection of a tool insert with optimum machining performance criteria for the given criteria and requirements is obtained following a comparative analysis of the five tool inserts which were originally selected. See Figure 3 for a graphical display of the INPUT/RESULTS for example 2, as described herein In summary, numerous benefits result from employing the concepts of the present invention. The present invention employs a computer implemented method for achieving optimum selection of machining parameters and tool inserts for finish turning operations based upon both classic metal cutting theories and an experimental database of test results. Application of numerical methods show that the methodology of the present invention can be used to considerable advantage in specifying the machining variables. The application of the present invention as a computer implemented method facilitates the application of the methodology of the present invention. Specifically, the computer implemented method allows for the simultaneous consideration of the various machining performance criteria which are highly interactive and need to be taken into consideration when defining optimum cutting conditions or selecting optimum tool inserts for particular machining performance requirements. Further, the use of the computer implemented method of the present invention makes the invention more easily accessible to industry, as well as, results in a substantial increase in productivity for machining operations. Thus, the present invention represents a significant advance in the area of finish turning operations.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

We claim:

1. A computer implemented method for predicting optimum machining performance criteria in finish turning operations, said computer implemented method comprising the steps of:

developing a process model, said model relating performance variables for said operation with process parameters for said anticipated operation;

selecting one of the performance variables for optimization, the other performance variables and the process parameters acting as constraints on the optimization;

applying non-linear programming techniques to said process model, whereby optimum cutting conditions may be determined for a given tool insert or an optimum tool insert may be selected for given machining performance requirements.

2. The computer implemented method as set forth in claim 1, wherein said performance variables may be selected from the group consisting of cutting force, tool life, material removal rate, surface roughness and chip breakability.

3. The computer implemented method as set forth in claim 1, wherein said process parameters may be selected from the group consisting of cutting speed, feed and depth of cut.

4. A computer implemented method for predicting optimum machining performance criteria in finish turning operations, said computer implemented method comprising the steps of:

developing a process model, said model relating performance variables for said operation with process parameters for said operation, said performance variables being selected from the group consisting of cutting force, tool life, material removal rate, surface roughness and chip breakability;

selecting one of the performance variables for optimization, the other performance variables and the process parameters acting as constraints on the optimization;

applying non-linear programming techniques to said process model, whereby optimum cutting conditions may be determined for a given tool insert or an optimum tool insert may be selected for given machining performance requirements;

wherein development of said process model includes modeling said performance variable cutting force based upon cutting force values expressed in the form of $$F_z = C_z f^{\alpha_z} d^{\beta_z} + E_z d^{\gamma_z}$$

where:

$F_z$ = component of cutting force in the cutting direction
f = feed
d = depth of cut
$C_z$ and $E_z$ = force constants
$\alpha_z$ = feed exponent
$\beta_z$ and $\gamma_z$ = depth of cut exponents.

5. A computer implemented method for predicting optimum machining performance criteria in finish turning operations, said computer implemented method comprising the steps of:

developing a process model, said model relating performance variables for said operation with process parameters for said operation, said performance variables being selected from the group consisting of cutting force, tool life, material removal rate, surface roughness and chip breakability;

selecting one of the performance variables for optimization, the other performance variables and the process parameters acting as constraints on the optimization;

applying non-linear programming techniques to said process model, whereby optimum cutting conditions may be determined for a given tool insert or an optimum tool insert may be selected for given machining performance requirements;

wherein development of said process model includes modeling said performance variable tool life based upon tool life values expressed in the form of $$T = \frac{C}{V^{\frac{1}{n}} f^{\frac{1}{m}} d^{\frac{1}{l}}}$$

where:

T = tool-life
V = cutting speed
f = feed
d = depth of cut
C, n, m, and l = constants for given work and tool material.

6. A computer implemented method for predicting optimum machining performance criteria in finish turning operations, said computer implemented method comprising the steps of:

developing a process model, said model relating performance variables for said operation with process parameters for said operation, said performance variables being selected from the group consisting of cutting force, tool life, material removal rate, surface roughness and chip breakability;

selecting one of the performance variables for optimization, the other performance variables and the process parameters acting as constraints on the optimization;

applying non-linear programming techniques to said process model, whereby optimum cutting conditions may be determined for a given tool insert or an optimum tool insert may be selected for given machining performance requirements;

wherein development of said process model includes modeling said performance variable material removal rate based upon material removal rate values expressed in the form of $$MRR = 1000 V f d$$

where:

V = cutting speed m/min
f = feed mm/rev
d = depth of cut mm.

7. A computer implemented method for predicting optimum machining performance criteria in finish turning operations, said computer implemented method comprising the steps of:

developing a process model, said model relating performance variables for said operation with process parameters for said operation, said performance variables being selected from the group consisting of cutting force, tool life, material removal rate, surface roughness and chip breakability;

selecting one of the performance variables for optimization, the other performance variables and the process parameters acting as constraints on the optimization;

applying non-linear programming techniques to said process model, whereby optimum cutting conditions may be determined for a given tool insert or an optimum tool insert may be selected for given machining performance requirements;

wherein development of said process model includes modeling said performance variables surface roughness and chip breakability by applying numerical methods of data interpolation to experimentally obtained surface roughness and chip breakability data.

* * * * *